US011960240B2

(12) United States Patent
Nishi et al.

(10) Patent No.: US 11,960,240 B2
(45) Date of Patent: Apr. 16, 2024

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Masashi Nishi, Kanagawa (JP); Kunihiko Sekido, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 518 days.

(21) Appl. No.: 17/214,001

(22) Filed: Mar. 26, 2021

(65) Prior Publication Data

US 2021/0318629 A1 Oct. 14, 2021

(30) Foreign Application Priority Data

Apr. 13, 2020 (JP) ................................ 2020-071956

(51) Int. Cl.
*G03G 5/147* (2006.01)
*G03G 15/00* (2006.01)
*G03G 21/18* (2006.01)

(52) U.S. Cl.
CPC ......... *G03G 5/14704* (2013.01); *G03G 15/75* (2013.01); *G03G 21/1814* (2013.01)

(58) Field of Classification Search
CPC ....................... G03G 5/14704; G03G 5/14752
See application file for complete search history.

(56) References Cited

U.S. PATENT DOCUMENTS

| | | | |
|---|---|---|---|
| 5,604,061 | A | 2/1997 | Sekido et al. |
| 6,228,546 | B1 | 5/2001 | Kashizaki et al. |
| 7,141,341 | B2 | 11/2006 | Sekido et al. |
| 8,343,699 | B2 | 1/2013 | Nagasaka et al. |
| 8,465,889 | B2 | 6/2013 | Sekido et al. |
| 8,524,430 | B2 | 9/2013 | Takagi et al. |
| 8,546,050 | B2 | 10/2013 | Maruyama et al. |
| 8,632,931 | B2 | 1/2014 | Sekido et al. |
| 8,795,936 | B2 | 8/2014 | Sekido et al. |
| 9,029,054 | B2 | 5/2015 | Okuda et al. |
| 9,063,505 | B2 | 6/2015 | Sekiya et al. |
| 9,069,267 | B2 | 6/2015 | Kaku et al. |
| 9,164,406 | B2 | 10/2015 | Nishi et al. |
| 9,207,550 | B2 | 12/2015 | Okuda et al. |
| 9,280,072 | B2 | 3/2016 | Ogaki et al. |

(Continued)

FOREIGN PATENT DOCUMENTS

| | | | | |
|---|---|---|---|---|
| EP | 0645682 A2 * | 9/1994 | ............. G03G 15/00 |
| EP | 0 645 682 A2 | 3/1995 | |

(Continued)

OTHER PUBLICATIONS

U.S. Appl. No. 17/223,795, Kunihiko Sekido, filed Apr. 6, 2021.

*Primary Examiner* — Peter L Vajda
(74) *Attorney, Agent, or Firm* — VENABLE LLP

(57) ABSTRACT

Provided is an electrophotographic photosensitive member including an electroconductive support, a photosensitive layer, and a protection layer, wherein the protection layer contains electroconductive particles, a content of the electroconductive particles in the protection layer is 40 to 70 vol %, and a volume resistivity of the protection layer is $1.0\times10^{9}$ to $1.0\times10^{14}$ $\Omega\cdot$cm.

7 Claims, 1 Drawing Sheet

(56) References Cited

U.S. PATENT DOCUMENTS

| | | | |
|---|---|---|---|
| 9,335,645 | B2 | 5/2016 | Tagami et al. |
| 9,442,401 | B2 | 9/2016 | Sekido et al. |
| 9,477,163 | B2 | 10/2016 | Nishi et al. |
| 9,760,030 | B2 | 9/2017 | Sekiya et al. |
| 9,772,568 | B2 | 9/2017 | Sekido et al. |
| 9,811,011 | B2 | 11/2017 | Nishi et al. |
| 9,851,648 | B2 | 12/2017 | Nishi et al. |
| 9,864,285 | B2 | 1/2018 | Nishi et al. |
| 9,921,498 | B2 | 3/2018 | Sekido et al. |
| 10,372,050 | B2 | 8/2019 | Nishi et al. |
| 2012/0301179 | A1 | 11/2012 | Nonaka |
| 2020/0041918 | A1 | 2/2020 | Nishi |

FOREIGN PATENT DOCUMENTS

| | | | |
|---|---|---|---|
| EP | 0 747 780 | A2 | 12/1996 |
| EP | 0 798 599 | A1 | 10/1997 |
| EP | 1 174 771 | A1 | 1/2002 |
| EP | 1 383 008 | A2 | 1/2004 |
| EP | 3 367 167 | A1 | 8/2018 |
| JP | 7-129056 | A | 5/1995 |
| JP | 9-288373 | A | 11/1997 |
| JP | 11-65234 | A | 3/1999 |
| JP | 2001-125294 | A | 5/2001 |
| JP | 2004-46222 | A | 2/2004 |
| JP | 2002-214815 | A | 7/2007 |
| JP | 2009-229495 | A | 10/2009 |
| JP | 2013-8014 | A | 1/2013 |
| JP | 2014-199391 | A | 10/2014 |
| JP | 2020-20919 | A | 2/2020 |

* cited by examiner

ELECTROPHOTOGRAPHIC PHOTOSENSITIVE MEMBER, PROCESS CARTRIDGE, AND ELECTROPHOTOGRAPHIC APPARATUS

This application claims the benefit of Japanese Patent Application No. 2020-071956, filed Apr. 13, 2020 which is hereby incorporated by reference herein in its entirety.

BACKGROUND OF THE INVENTION

Field of the Invention

The present invention relates to an electrophotographic photosensitive member, a process cartridge including the electrophotographic photosensitive member, and an electrophotographic apparatus including the electrophotographic photosensitive member.

Description of the Related Art

An electrophotographic photosensitive member containing an organic photoconductive substance (charge generating substance) has been widely used as an electrophotographic photosensitive member mounted in an electrophotographic apparatus.

Recently, in order to implement a long lifespan of the electrophotographic photosensitive member and high image quality during repetitive use, it is required to improve mechanical durability (abrasion resistance) of the electrophotographic photosensitive member. Meanwhile, when the mechanical durability of the electrophotographic photosensitive member is improved, a discharge product produced during a charging process remains on a surface of the electrophotographic photosensitive member, which may cause image smearing.

A material used for a surface layer of the electrophotographic photosensitive member deteriorates due to an oxidizing gas such as ozone or nitrogen oxide, generated by discharge on the surface of the electrophotographic photosensitive member. In addition, the surface of the electrophotographic photosensitive member has a low resistance due to adsorption of moisture. It is considered that these phenomena cause the image smearing.

In addition, as the abrasion resistance of the surface of the electrophotographic photosensitive member becomes higher, the surface of the electrophotographic photosensitive member is less likely to be refreshed (removal of substances that cause the image smearing, such as deteriorated materials or adsorbed moisture), and the image smearing is likely to occur.

As a technique for suppressing the image smearing, a method of adding an additive to the surface layer of the electrophotographic photosensitive member is used. Japanese Patent Application Laid-Open No. 2014-199391 discloses a technique for suppressing image smearing by adding an additive having a specific alkylamine structure to a surface layer of an electrophotographic photosensitive member containing a curable resin. In addition, Japanese Patent Application Laid-Open No. 2013-008014 discloses a technique for suppressing image smearing caused due to an electrophotographic photosensitive member by adding a polymer obtained by polymerizing a specific urea compound to a surface layer of the electrophotographic photosensitive member.

In the techniques disclosed in Japanese Patent Application Laid-Open No. 2014-199391 and Japanese Patent Application Laid-Open No. 2013-008014, during an electrophotographic process, the image smearing may not be sufficiently suppressed.

SUMMARY OF THE INVENTION

An object of the present invention is to provide an electrophotographic photosensitive member excellent in suppression of image smearing.

In addition, another object of the present invention is to provide a process cartridge including the electrophotographic photosensitive member, and an electrophotographic apparatus including the electrophotographic photosensitive member.

The above objects are achieved by the following present inventions.

According to an aspect of the present invention, an electrophotographic photosensitive member includes an electroconductive support, a photosensitive layer, and a protection layer, wherein the protection layer contains electroconductive particles, a content of the electroconductive particles in the protection layer is 40 to 70 vol %, and a volume resistivity of the protection layer is $1.0\times10^9$ to $1.0\times10^{14}$ Ω·cm.

According to another aspect of the present invention, a process cartridge integrally supports the electrophotographic photosensitive member and at least one unit selected from the group consisting of a charging unit, a developing unit, and a cleaning unit, and is detachably attachable to a main body of an electrophotographic apparatus.

According to still another aspect of the present invention, an electrophotographic apparatus includes the electrophotographic photosensitive member, a charging unit, an exposing unit, a developing unit, and a transfer unit.

Further features of the present invention will become apparent from the following description of exemplary embodiments with reference to the attached drawings.

DESCRIPTION OF THE EMBODIMENTS

Figure 1:
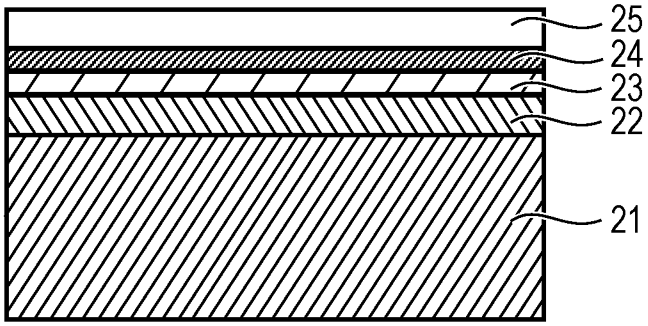
FIG. 1 is a view schematically illustrating an example of a configuration of an electrophotographic photosensitive member according to the present invention.

Preferred embodiments of the present invention will now be described in detail in accordance with the accompanying drawings.

An electrophotographic photosensitive member according to the present invention includes an electroconductive support, a photosensitive layer, and a protection layer, wherein the protection layer contains electroconductive particles, a content of the electroconductive particles in the protection layer is 40 to 70 vol %, and a volume resistivity of the protection layer is $1.0\times10^9$ to $1.0\times10^{14}$ Ω·cm.

Here, the volume resistivity can be determined using a picoampere (pA) meter as follows.

First, a comb-shaped gold electrode is manufactured by deposition on a polyethylene terephthalate (PET) film. As for the comb-shaped gold electrode, an inter-electrode distance (D) is 180 μm, a length (L) of the electrode in a direction perpendicular to a direction in which comb teeth extend is 5.9 cm, and the number of comb teeth is 6 pairs (12 in total).

Next, a protection layer having a thickness (T) of 2 μm is provided on the manufactured comb-shaped gold electrode so that the protection layer is sufficiently large to cover a range of the length of the electrode in the direction perpendicular to the direction in which the comb teeth extent and gaps between the electrodes. Thereafter, a direct current (DC) (I) when a DC voltage (V) of 100 V is applied to the comb-shaped gold electrode is measured under an environment of a temperature of 23° C. and a humidity of 50% RH to obtain a volume resistivity according to the following equation.

$$\text{Volume resistivity } (\Omega\cdot\text{cm}) = V\,(\text{V}) \times T\,(\text{cm}) \times L\,(\text{cm}) / \{I\,(\text{A}) \times D\,(\text{cm})\}$$

The reason why the electrophotographic photosensitive member according to the present invention is excellent in suppression of image smearing is presumed by the present inventors as follows.

As described above, a low resistance on a surface of the electrophotographic photosensitive member is considered as one of the causes of the image smearing. In the present invention, the electrophotographic photosensitive member includes the protection layer as surface layer of the electrophotographic photosensitive member, the protection layer contains the electroconductive particles in a proportion of 40 to 70 vol %, and the volume resistivity of the protection layer is $1.0\times10^{9}$ to $1.0\times10^{14}$ Ω·cm, which is relatively high. Therefore, it is considered that the electrophotographic photosensitive member according to the present invention has a charge retainability, and in an electrophotographic process, charges are directly injected from a charging member to the electroconductive particles in the protection layer. Therefore, it is considered that discharge between the charging member and the electrophotographic photosensitive member is suppressed to reduce a production amount of a discharge product. As a result, it is considered that the low resistance on the surface of the electrophotographic photosensitive member due to the discharge product is less likely to be caused, and the image smearing is thus effectively suppressed.

An injectability of the electrophotographic photosensitive member according to the present invention is preferably 0.70 or more, more preferably 0.75 or more, and still more preferably 0.80 or more.

Here, the injectability can be evaluated as follows.

The electrophotographic photosensitive member is mounted in the electrophotographic apparatus, 1,000 V is applied to a charging roller with a direct current, and the electrophotographic photosensitive member is charged while the electrophotographic photosensitive member is rotated at 60 rpm, under an environment of a temperature of 23° C. and a humidity of 50% RH. In this case, a value given by A/1,000 is defined as the injectability, in which A is a value obtained by measuring a potential on the surface of the electrophotographic photosensitive member.

Hereinafter, a configuration of the electrophotographic photosensitive member of the present invention will be described with reference to FIG. 1.

<Support>

In the present invention, a support 21 is an electroconductive support having electroconductivity. Examples of a shape of the support can include a cylindrical shape, a belt shape, and a sheet shape. Among them, a cylindrical support is preferred. In addition, a surface of the support may be subjected to an electrochemical treatment such as anodization, a blast treatment, or a cutting treatment.

As a material for the support, a metal, a resin, or glass is preferred.

Examples of the metal can include aluminum, iron, nickel, copper, gold, stainless steel, and alloys thereof. Among them, an aluminum support obtained by using aluminum is preferred.

In a case where the material for the support is a resin or glass, electroconductivity is applied by a treatment such as mixing or coating of an electroconductive material.

<Electroconductive Layer>

In the electrophotographic photosensitive member according to the present invention, an electroconductive layer may be provided on the support. By providing the electroconductive layer, scratches or unevenness on the surface of the support can be concealed, or reflection of light on the surface of the support can be controlled.

The electroconductive layer preferably contains electroconductive particles and a resin.

Examples of a material for the electroconductive particle can include a metal oxide, a metal, and carbon black.

Examples of the metal oxide can include zinc oxide, aluminum oxide, indium oxide, silicon oxide, zirconium oxide, tin oxide, titanium oxide, magnesium oxide, antimony oxide, and bismuth oxide. Examples of the metal can include aluminum, nickel, iron, nichrome, copper, zinc, and silver.

Among them, the metal oxide is preferably used for the electroconductive particle. In particular, titanium oxide, tin oxide, or zinc oxide is more preferably used for the electroconductive particle.

In a case where the metal oxide is used for the electroconductive particle, a surface of the metal oxide may be treated with a silane coupling agent or the like, or the metal oxide may be doped with an element such as phosphorus or aluminum, or an oxide thereof.

In addition, the electroconductive particle may have a laminate structure having a core particle and a coating layer that coats the core particle. Examples of a material for the core particle can include titanium oxide, barium sulfate, and zinc oxide. An example of a material for the coating layer can include a metal oxide such as tin oxide.

In addition, in a case where the metal oxide is used for the electroconductive particle, a volume average particle size of the electroconductive particles is preferably 1 nm to 500 nm, and more preferably 3 nm to 400 nm.

Examples of the resin can include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain a masking agent such as silicone oil, resin particles, or titanium oxide.

The electroconductive layer can be formed by preparing a coating liquid for an electroconductive layer containing the above-described respective materials and a solvent, forming a coating film thereof on the support, and drying the coating film. Examples of the solvent used in the coating liquid can include an alcohol-based solvent, a sulfoxide-based solvent, a ketone-based solvent, an ether-based solvent, an ester-based solvent, and an aromatic hydrocarbon-based solvent. Examples of a method for dispersing the electroconductive particles in the coating liquid for an electroconductive layer can include methods using a paint shaker, a sand mill, a ball mill, and a liquid collision-type high-speed disperser.

A thickness of the electroconductive layer is preferably 1 μm to 40 μm, and particularly preferably 3 μm to 30 μm.

<Undercoat Layer>

In the present invention, an undercoat layer 22 may be provided on the support or the electroconductive layer. By providing the undercoat layer, an adhesive function between layers can be increased to impart a charge injection inhibiting function.

The undercoat layer preferably contains a resin. In addition, the undercoat layer may be formed as a cured film by polymerization of a composition containing a monomer having a polymerizable functional group.

Examples of the resin can include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamide acid resin, a polyimide resin, a polyamide imide resin, and a cellulose resin.

Examples of the polymerizable functional group included in the monomer having the polymerizable functional group can include an isocyanate group, a block isocyanate group, a methylol group, an alkylated methylol group, an epoxy group, a metal alkoxide group, a hydroxyl group, an amino group, a carboxyl group, a thiol group, a carboxylic acid anhydride group, and a carbon-carbon double bond group.

In addition, the undercoat layer may further contain an electron transporting substance, a metal oxide, a metal, an electroconductive polymer, and the like, in order to improve electric characteristics. Among them, an electron transporting substance or a metal oxide is preferably used.

Examples of the electron transporting substance can include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron transporting substance having a polymerizable functional group may be used as the electron transporting substance and copolymerized with the above-mentioned monomer having the polymerizable functional group to form an undercoat layer as a cured film.

Examples of the metal oxide can include indium tin oxide, tin oxide, indium oxide, titanium oxide, zinc oxide, aluminum oxide, and silicon dioxide. Examples of the metal can include gold, silver, and aluminum.

Metal oxide particles contained in the undercoat layer may be subjected to a surface treatment using a surface treatment agent such as a silane coupling agent.

A general method can be used as a method of surface-treating the metal oxide particles. For example, examples thereof can include a dry method and a wet method.

In the dry method, an alcohol aqueous solution, organic solvent solution, or aqueous solution containing a surface treatment agent is added to and uniformly dispersed in the metal oxide particles while stirring the metal oxide particles in a mixer capable of high-speed stirring, such as a Henschel mixer, and then drying is performed.

In addition, in the wet method, the metal oxide particles and the surface treatment agent are stirred in a solvent, or dispersed by using glass beads with a sand mill, and after the dispersion, the solvent is removed by filtration or vacuum distillation. It is preferable that, after removing the solvent, baking is further performed at 100° C. or higher.

The undercoat layer may further contain an additive, and can contain known materials, for example, metal powder such as aluminum, an electroconductive substance such as carbon black, a charge transporting substance, a metal chelate compound, and an organometallic compound.

Examples of the charge transporting substance can include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. A charge transporting substance having a polymerizable functional group may be used as the charge transporting substance and copolymerized with the monomer having the polymerizable functional group to form an undercoat layer as a cured film.

The undercoat layer can be formed by preparing a coating liquid for an undercoat layer containing the respective materials and a solvent, forming a coating film thereof on the support or the electroconductive layer, and drying and/or curing the coating film.

As the solvent used for the coating liquid for an undercoat layer can include organic solvents such as alcohol, sulfoxide, ketone, ether, ester, aliphatic halogenated hydrocarbon, and an aromatic compound. In the present invention, an alcohol-based solvent or a ketone-based solvent is preferably used.

Examples of a dispersion method for preparing the coating liquid for an undercoat layer can include methods using a homogenizer, an ultrasonic disperser, a ball mill, a sand mill, a roll mill, a vibration mill, an attritor, and a liquid collision-type high-speed disperser.

An average thickness of the undercoat layer is preferably 0.1 μm to 10 μm, and more preferably 0.1 μm to 5 μm.

<Photosensitive Layer>

A photosensitive layer of the electrophotographic photosensitive member is mainly classified into (1) a laminate type photosensitive layer and (2) a monolayer type photosensitive layer. (1) The laminate type photosensitive layer is a photosensitive layer having a charge generation layer containing a charge generating substance and a charge transport layer containing a charge transporting substance. (2) The monolayer type photosensitive layer is a photosensitive layer containing both a charge generating substance and a charge transporting substance.

(1) Laminate Type Photosensitive Layer

The laminate type photosensitive layer has a charge generation layer 23 and a charge transport layer 24.

(1-1) Charge Generation Layer

The charge generation layer 23 preferably contains a charge generating substance and a resin.

Examples of the charge generating substance can include an azo pigment, a perylene pigment, a polycyclic quinone pigment, an indigo pigment, and a phthalocyanine pigment. Among them, an azo pigment or a phthalocyanine pigment is preferred. Among the phthalocyanine pigments, an oxytitanium phthalocyanine pigment, a chlorogallium phthalocyanine pigment, or a hydroxygallium phthalocyanine pigment is preferred.

A content of the charge generating substance in the charge generation layer is preferably 40 to 85% by mass, and more preferably 60 to 80% by mass, with respect to a total mass of the charge generation layer.

Examples of the resin can include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Among them, a polyvinyl butyral resin is more preferred.

In addition, the charge generation layer may further contain an additive such as an antioxidant or an ultraviolet absorber. Specific examples thereof can include a hindered phenol compound, a hindered amine compound, a sulfur compound, a phosphorus compound, and a benzophenone compound.

The charge generation layer can be formed by preparing a coating liquid for a charge generation layer containing the above-described respective materials and a solvent, forming a coating film thereof on the support, the electroconductive layer, or the undercoat layer, and drying the coating film. Examples of the solvent used in the coating liquid can include an alcohol-based solvent, a sulfoxide-based solvent, a ketone-based solvent, an ether-based solvent, an ester-based solvent, and an aromatic hydrocarbon-based solvent.

An average thickness of the charge generation layer is preferably 0.1 μm to 1 μm, and more preferably 0.15 μm to 0.4 μm.

(1-2) Charge Transport Layer

The charge transport layer 24 preferably contains a charge transporting substance and a resin.

Examples of the charge transporting substance can include a polycyclic aromatic compound, a heterocyclic compound, a hydrazone compound, a styryl compound, an enamine compound, a benzidine compound, a triarylamine compound, and a resin having a group derived from these substances. Among them, a triarylamine compound or a benzidine compound is preferred.

A content of the charge transporting substance in the charge transport layer is preferably 25 to 70% by mass, and more preferably 30 to 55% by mass, with respect to a total mass of the charge transport layer.

Examples of the resin can include a polyester resin, a polycarbonate resin, an acrylic resin, and a polystyrene resin. Among them, a polycarbonate resin or a polyester resin is preferred. As the polyester resin, a polyarylate resin is particularly preferred.

A content ratio (mass ratio) of the charge transporting substance to the resin is preferably 4:10 to 20:10 and more preferably 5:10 to 12:10.

In addition, the charge transport layer may also contain an additive such as an antioxidant, an ultraviolet absorber, a plasticizer, a leveling agent, a lubricity imparting agent, or an abrasion resistance improver. Specific examples thereof can include a hindered phenol compound, a hindered amine compound, a sulfur compound, a phosphorus compound, a benzophenone compound, a siloxane-modified resin, silicone oil, a fluorine resin particle, a polystyrene resin particle, a polyethylene resin particle, a silica particle, an alumina particle, and a boron nitride particle.

The charge transport layer can be formed by preparing a coating liquid for a charge transport layer containing the above-described respective materials and a solvent, forming a coating film thereof on the charge generation layer, and drying the coating film. Examples of the solvent used in the coating liquid can include an alcohol-based solvent, a ketone-based solvent, an ether-based solvent, an ester-based solvent, and an aromatic hydrocarbon-based solvent. Among these solvents, an ether-based solvent or an aromatic hydrocarbon-based solvent is preferred.

An average thickness of the charge transport layer is preferably 3 μm to 50 μm, more preferably 5 μm to 40 μm, and particularly preferably 10 μm to 30 μm.

(2) Monolayer Type Photosensitive Layer

The monolayer type photosensitive layer can be formed by preparing a coating liquid for a photosensitive layer containing a charge generating substance, a charge transporting substance, a resin, and a solvent, forming a coating film thereof on the support, the electroconductive layer, or the undercoat layer, and drying the coating film. Examples of materials of the charge generating substance, the charge transporting substance, and the resin are the same as in the "(1) Laminate type photosensitive layer".

<Protection Layer>

A protection layer 25 may contain a polymer of a compound having a polymerizable functional group and a binder resin.

Examples of the polymerizable functional group can include an isocyanate group, a block isocyanate group, a methylol group, an alkylated methylol group, an epoxy group, a metal alkoxide group, a hydroxyl group, an amino group, a carboxyl group, a thiol group, a carboxylic acid anhydride group, a carbon-carbon double bond group, an alkoxysilyl group, and a silanol group. A monomer having charge transporting ability may also be used as the compound having a polymerizable functional group. In particular, the protection layer preferably contains a polymer of a composition containing a radically polymerizable monomer.

Examples of the binder resin can include a polyester resin, an acrylic resin, a phenoxy resin, a polycarbonate resin, a polystyrene resin, a phenol resin, a melamine resin, and an epoxy resin. Among them, an acrylic resin is preferred.

Examples of the electroconductive particle contained in the protection layer can include particles of metal oxides such as titanium oxide, zinc oxide, tin oxide, and indium oxide.

In a case where the metal oxide is used for the electroconductive particle, the metal oxide may contain elements such as niobium, phosphorus, and aluminum, and oxides thereof.

In addition, the electroconductive particle may have a laminate structure having a core particle and a coating layer that coats the core particle. Examples of a material for the core particle can include titanium oxide, barium sulfate, and zinc oxide. Examples of a material for the coating layer can include a metal oxide such as titanium oxide or tin oxide.

The electroconductive particle is particularly preferably a niobium-containing titanium oxide particle.

Examples of a shape of the niobium-containing titanium oxide particle can include various shapes such as a spherical shape, a polyhedral shape, an ellipsoidal shape, a flaky shape, and a needle shape. Among them, a spherical shape, a polyhedral shape, or an ellipsoidal shape is preferred, from the viewpoint of reducing image defects such as black spots. In the present invention, it is more preferable that the niobium-containing titanium oxide particle has a spherical shape or a polyhedral shape close to a spherical shape.

The niobium-containing titanium oxide particle is preferably an anatase-type or rutile-type titanium oxide particle, and more preferably an anatase-type titanium oxide particle. By using an anatase-type titanium oxide particle, the injectability is improved.

In the present invention, the electroconductive particle is particularly preferably a particle containing anatase-type titanium oxide as a core material, and titanium oxide coating a surface of the core material and containing niobium.

When the electroconductive particles include the niobium-containing titanium oxide particles, a content of the niobium in the electroconductive particles is preferably 0.5 to 15.0% by mass, and more preferably 2.6 to 10.0% by mass. When the content of the niobium in the electroconductive particles is 0.5% by mass or more, an effect of suppressing image smearing can be increased, and when the content of the niobium in the electroconductive particles is 15.0% by mass or less, the volume resistivity of the protection layer does not become too large.

In a case where a metal oxide is used for the electroconductive particle, it is preferable to treat a surface of the metal oxide particle with a silane coupling agent or the like, from the viewpoint of dispersibility and liquid stability.

In addition, in a case where the metal oxide is used for the electroconductive particle, a volume average particle size of the electroconductive particles is preferably 1 nm to 500 nm, more preferably 3 nm to 300 nm, and still more preferably 5 nm to 100 nm.

A content of the electroconductive particles in the protection layer is 40 to 70 vol %, and is preferably 45 to 65 vol %, from the viewpoint of suppression of the image smearing and strength of the protection layer. When the content of the electroconductive particles in the protection layer is 40 vol % or more, the effect of suppressing the image smearing can be sufficiently obtained, and when the content of the electroconductive particles in the protection layer is 70 vol % or less, it is possible to prevent the protection layer itself from being brittle.

The protection layer may also contain an additive such as an antioxidant, an ultraviolet absorber, a plasticizer, a leveling agent, a lubricity imparting agent, or an abrasion resistance improver. Specific examples of the additive can include a hindered phenol compound, a hindered amine compound, a sulfur compound, a phosphorus compound, a benzophenone compound, a siloxane-modified resin, silicone oil, a fluorine resin particle, a polystyrene resin particle, a polyethylene resin particle, a silica particle, an alumina particle, and a boron nitride particle.

The protection layer can be formed by preparing a coating liquid for a protection layer containing the above-mentioned respective materials and a solvent, forming a coating film thereof on the photosensitive layer, and drying and/or curing the coating film. Examples of the solvent used in the coating liquid can include an alcohol-based solvent, a ketone-based solvent, an ether-based solvent, a sulfoxide-based solvent, an ester-based solvent, and an aromatic hydrocarbon-based solvent.

The volume resistivity of the protection layer is $1.0\times10^{9}$ to $1.0\times10^{14}$ Ω·cm, and preferably $1.0\times10^{10}$ to $1.0\times10^{13}$ Ω·cm, from the viewpoint of the charge retainability.

Here, the charge retainability is an index for simply evaluating stability retainability of charges on a surface of the electrophotographic photosensitive member to which a rectangular wave voltage is applied, from a change in shape of the rectangular wave over time, that is, stability of a latent image.

The charge retainability is determined by the following procedures 1 to 4:

Procedure 1: A voltage is applied to the surface of the electrophotographic photosensitive member from one direction while rotating the electrophotographic photosensitive member at a rotational speed of 30 rpm under an environment of a temperature of 23° C. and a humidity of 50% RH, and the voltage is a rectangular wave voltage having a frequency of 1 Hz, a Voffset of −450 V, and a Vpp of 500 V;

Procedure 2: A potential on the surface of the electrophotographic photosensitive member is measured at a position at which a portion to which the voltage is applied to the surface of the electrophotographic photosensitive member is rotated for 0.30 seconds at a measurement interval of 100 μs for a predetermined time within the range from 10 seconds to 20 seconds;

Procedure 3: The values obtained by the measurement are plotted using μs as a unit of a horizontal axis and V as a unit of a vertical axis, and a slope of each of a regression line derived from previous 25 measurement points and a regression line derived from latter 25 measurement points is determined at each measurement point; and Procedure 4: A value calculated by averaging absolute values of a maximum value and a minimum value of the obtained slopes is defined as the charge retainability.

In the procedure 3, since the number of the measurement points for deriving the regression lines is less than 25, initial 24 points obtained from the start of the measurement and 24 points obtained before the end of the measurement are not used as data for determining the slope.

The charge retainability is preferably 9.5 or more and more preferably 10.0 or more.

A thickness of the protection layer is preferably 0.2 μm to 5 μm and more preferably 0.5 μm to 3 μm.

[Process Cartridge and Electrophotographic Apparatus]

A process cartridge according to the present invention integrally supports the electrophotographic photosensitive member described above and at least one unit selected from the group consisting of a charging unit, a developing unit, and a cleaning unit, and is detachably attachable to a main body of an electrophotographic apparatus.

In addition, the electrophotographic apparatus according to the present invention includes the electrophotographic photosensitive member described above, a charging unit, an exposing unit, a developing unit, and a transfer unit.

Figure 2:
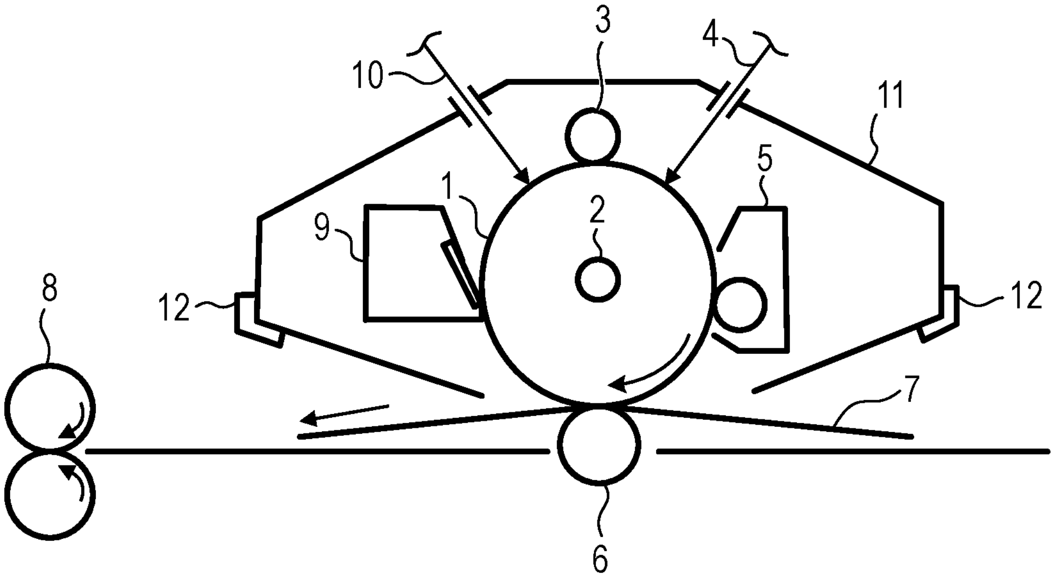
FIG. 2 is a view illustrating an example of a schematic configuration of a process cartridge in which the electrophotographic photosensitive member according to the present invention is mounted, and an electrophotographic apparatus including the process cartridge.

FIG. 2 illustrates an example of a schematic configuration of the electrophotographic apparatus including the process cartridge including the electrophotographic photosensitive member.

A cylindrical (drum-like) electrophotographic photosensitive member 1 is rotatably driven about a shaft 2 in the arrow direction at a predetermined peripheral velocity (process speed). A surface of the electrophotographic photosensitive member 1 is charged with a predetermined positive or negative potential by a charging unit 3 during the rotation. Although a roller charging system using a roller type charging member is illustrated in FIG. 2, a charging system such as a corona charging system, a proximity charging system, or an injection charging system may also be adopted.

The surface of the charged electrophotographic photosensitive member 1 is irradiated with exposure light 4 emitted from an exposing unit (not illustrated), and an electrostatic latent image corresponding to target image information is formed on the surface of the electrophotographic photosensitive member 1. The exposure light 4 is light intensity-modulated in response to time-series electric digital image signals of the target image information, and is outputted from, for example, an image exposing unit for slit exposing or exposing with scanning laser beams.

The electrostatic latent image formed on the surface of the electrophotographic photosensitive member 1 is developed (normal development or reversal development) with a toner stored in a developing unit 5, and a toner image is formed on the surface of the electrophotographic photosensitive member 1. The toner image formed on the surface of the electrophotographic photosensitive member 1 is transferred onto a transfer material 7 by a transfer unit 6. In this case, a bias voltage having a polarity reversal of the charge retained on the toner is applied to the transfer unit 6 from a bias power supply (not illustrated).

In addition, in a case where the transfer material 7 is a paper, the transfer material 7 is taken out from a paper feed unit (not illustrated) to be fed between the electrophotographic photosensitive member 1 and the transfer unit 6 in synchronization with the rotation of the electrophotographic photosensitive member 1. The transfer material 7 onto which the toner image is transferred from the electrophotographic photosensitive member 1 is separated from the surface of the electrophotographic photosensitive member 1 so as to be conveyed to a fixing unit 8 by which the toner image is subjected to a fixing treatment. Thus, the transfer material 7 is printed out as an image formed matter (print or copy) to the outside of the electrophotographic apparatus.

The electrophotographic apparatus may also include a cleaning unit 9 for removing an adhered material such as the toner remaining on the surface of the electrophotographic photosensitive member 1 after the transfer. In addition, a so-called cleaner-less system configured to remove the adhered material by the developing unit 5 or the like may be used without separately providing the cleaning unit 9.

In the present invention, the electrophotographic photosensitive member 1, and a plurality of components selected from the charging unit 3, the developing unit 5, and the cleaning unit 9 can be accommodated in a container and integrally supported to form a process cartridge 11. In addition, the process cartridge formed as described above can be detachably attachable to the main body of the electrophotographic apparatus.

For example, the process cartridge is configured as follows. At least one selected from the charging unit 3, the developing unit 5, and the cleaning unit 9 is integrally supported together with the electrophotographic photosensitive member 1 so as to form a cartridge. The cartridge can be used as the process cartridge 11 detachably attachable to the main body of the electrophotographic apparatus using a guide unit 12 such as a rail of the main body of the electrophotographic apparatus.

The electrophotographic apparatus may also include an antistatic mechanism for an antistatic treatment performed on the surface of the electrophotographic photosensitive member 1 by pre-exposure light 10 from a pre-exposing unit (not illustrated). In addition, the guide unit 12 such as a rail may be provided for detachably attaching the process cartridge 11 of the present invention to the main body of the electrophotographic apparatus.

The electrophotographic photosensitive member according to the present invention can be used in, for example, a laser beam printer, an LED printer, a copying machine, a facsimile, and a composite machine thereof.

According to the present invention, it is possible to provide an electrophotographic photosensitive member excellent in suppression of image smearing, a process cartridge including the electrophotographic photosensitive member, and an electrophotographic apparatus including the electrophotographic photosensitive member.

EXAMPLES

Hereinafter, the present invention will be described in more detail with reference to Examples and Comparative Examples. The present invention is not limited to the following Examples without departing from the gist thereof. Further, in the description of the following Examples, unless otherwise specified, the term "part(s)" is on a mass basis.

Hereinafter, the present invention will be described in more detail with reference to Examples. In the Examples, "part(s)" refers to "part(s) by mass".

<Production of Electroconductive Particles>

(Production of Niobium-Containing Titanium Oxide Particles (T1-1))

Approximately spherical anatase-type titanium dioxide particles having a volume average particle size of 150 nm and having a content of niobium of 0.20% by mass were used as a core material. The core material was dispersed in water in an amount of 100 g to obtain a 1 L aqueous suspension, and the aqueous suspension was heated to 60° C.

A niobium solution obtained by dissolving 3 g of niobium pentachloride ($NbCl_5$) in 100 mL of hydrochloric acid having a concentration of 11.4 mol/L and 600 mL of a titanium sulfate solution containing 33.7 g of Ti were mixed with each other, thereby preparing a titanium niobate solution. The obtained titanium niobate solution and an aqueous sodium hydroxide solution having a concentration of 10.7 mol/L were simultaneously added dropwise over 3 hours so that a pH of the aqueous suspension was 2 to 3.

After completion of the dropwise addition, the suspension was filtered, washed, and dried for 8 hours at 110° C. The dried material was heat-treated at 800° C. for 1 hour in an air atmosphere to obtain powder of niobium-containing titanium oxide particles (T1-1), the particle having a core material containing titanium oxide and a coating layer containing titanium oxide containing niobium.

(Production of Niobium-Containing Titanium Oxide Particles (T1-2) to (T1-10))

In the production of the niobium-containing titanium oxide particles (T1-1), the volume average particle size of the used core material was changed as shown in Table 1, and the conditions during coating were appropriately changed. Powder of each of niobium-containing titanium oxide particles (T1-2) to (T1-10) was obtained in the same manner as in the production of the niobium-containing titanium oxide particles (T1-1) except for the above conditions. A content shown in Table 1 refers to a content of the niobium in the niobium-containing titanium oxide particles, and is a value obtained by performing measurement by an element analysis method using X-ray fluorescence (XRF).

(Production of Niobium-Containing Titanium Oxide Particles (T2-1))

Niobium sulfate (water-soluble niobium compound) was added to an aqueous titanyl sulfate solution so that the amount of niobium ions was 1.0% by mass with respect to the amount of titanium (in terms of titanium dioxide). Fine particle nuclei formed of titanium hydroxide were added to the aqueous titanyl sulfate solution, and the mixture was hydrolyzed by heating and boiling, thereby obtaining a hydrous titanium dioxide slurry.

The hydrous titanium dioxide slurry containing niobium ions was filtered and washed with water, and then dried at 110° C. for 8 hours. The dried material was heat-treated in an air atmosphere at 800° C. for 1 hour to obtain powder of niobium-containing titanium oxide particles (T2-1).

(Production of Niobium-Containing Titanium Oxide Particles (T2-2) to (T2-5))

In the production of the niobium-containing titanium oxide particles (T2-1), the amount of niobium sulfate added to the aqueous titanyl sulfate solution, a size of the fine particle nuclei added in the hydrolysis, and the temperature and hydrolysis rate during the hydrolysis were appropriately adjusted. Therefore, powder of each of niobium-containing titanium oxide particles (T2-2) to (T2-5) having a volume average particle size as shown in Table 1 was obtained.

TABLE 1

| Niobium-containing titanium oxide particle | Average particle size (nm) | Content (% by mass) |
|---|---|---|
| T1-1 | 170 | 5.0 |
| T1-2 | 180 | 5.0 |
| T1-3 | 190 | 5.0 |
| T1-4 | 210 | 2.6 |
| T1-5 | 260 | 2.6 |
| T1-6 | 300 | 8.0 |
| T1-7 | 170 | 0.5 |
| T1-8 | 170 | 10.0 |
| T1-9 | 190 | 15.0 |
| T1-10 | 160 | 0.5 |
| T2-1 | 220 | 1.1 |
| T2-2 | 180 | 2.8 |
| T2-3 | 220 | 0.5 |
| T2-4 | 300 | 5.0 |
| T2-5 | 170 | 0.1 |

<Production of Electrophotographic Photosensitive Member>

Example 1

An aluminum cylinder (JIS-A3003, aluminum alloy) having a diameter of 24 mm and a length of 257.5 mm was used as a support (electroconductive support).

Next, the following materials were prepared.

214 parts of titanium oxide ($TiO_2$) particles (volume average particle size of 230 nm) coated with oxygen-deficient tin oxide ($SnO_2$) as metal oxide particles 132 parts of phenol resin (monomer/oligomer of phenol resin) (trade name: Plyophen J-325, resin solid content: 60% by mass, manufactured by Dainippon Ink And Chemicals, Inc.) as binder material 98 parts of 1-methoxy-2-propanol as solvent These materials were added to a sand mill using 450 parts of glass beads having a diameter of 0.8 mm, and a dispersion treatment was performed under conditions of a rotation speed of 2,000 rpm, a dispersion treatment time of 4.5 hours, and a cooling water setting temperature of 18° C., thereby obtaining a dispersion. The glass beads were removed from the dispersion with a mesh (opening: 150 μm).

Silicone resin particles (trade name: TOSPEARL 120, average particle size of 2 μm, manufactured by Momentive Performance Materials, Inc.) as a surface roughness-imparting agent were added to the obtained dispersion. An addition amount of the silicone resin particles was set to 10% by mass with respect to a total mass of the metal oxide particles and the binder material in the dispersion after the glass beads were removed. In addition, silicone oil (trade name: SH28PA, manufactured by Dow Corning Toray Co., Ltd.) as a leveling agent was added to the dispersion so that a content of the silicone oil was 0.01% by mass with respect to the total mass of the metal oxide particles and the binder material in the dispersion.

Next, a solvent in which methanol and 1-methoxy-2-propanol (mass ratio: 1:1) were mixed with each other was added to the dispersion so that a total mass (that is, a mass of a solid content) of the metal oxide particles, the binder material, and the surface roughness-imparting agent in the dispersion was 67% by mass with respect to a mass of the dispersion. Thereafter, a coating liquid for an electroconductive layer was prepared by stirring the mixture.

The coating liquid for an electroconductive layer was applied onto the support by dip coating, and heating was performed at 140° C. for 1 hour, thereby forming an electroconductive layer having a thickness of 30 μm.

Next, the following materials were prepared.

3.11 parts of an electron transporting substance represented by the following Formula (E-1)

6.49 parts of blocked isocyanate (trade name: Duranate SBB-70P, manufactured by Asahi Kasei Corporation)

0.4 parts of styrene-acrylic resin (trade name: UC-3920, manufactured by Toagosei Co., Ltd.)

1.8 parts of silica slurry (trade name: IPA-ST-UP, solid content concentration: 15% by mass, viscosity: 9 mPa·s, manufactured by Nissan Chemical Industries, Ltd.)

These materials were dissolved in a solvent in which 48 parts of 1-butanol and 24 parts of acetone were mixed with each other, thereby preparing a coating liquid for an undercoat layer. The coating liquid for an undercoat layer was applied onto the electroconductive layer by dip coating, and heating was performed at 170° C. for 30 minutes, thereby forming an undercoat layer having a thickness of 0.7 μm.

(E-1)

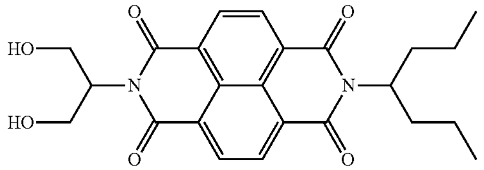

Next, 10 parts of crystalline hydroxygallium phthalocyanine having peaks at positions of 7.5° and 28.4° in a chart obtained by CuKα characteristic X-ray diffraction and 5 parts of a polyvinyl butyral resin (trade name: S-LEC BX-1, manufactured by SEKISUI CHEMICAL CO., LTD.) were prepared.

These materials were added to 200 parts of cyclohexanone and dispersed with a sand mill device using glass beads having a diameter of 0.9 mm for 6 hours. Cyclohexanone and ethyl acetate were further added thereto in amounts of 150 parts and 350 parts, respectively, and diluted, thereby obtaining a coating liquid for a charge generation layer.

The obtained coating liquid was applied onto the undercoat layer by dip coating, and drying was performed at 95° C. for 10 minutes, thereby forming a charge generation layer having a thickness of 0.20 μm.

Measurement of X-ray diffraction was performed under the following conditions.

[Powder X-Ray Diffraction Measurement]

Used measuring machine: X-ray diffractometer RINT-TTRII, manufactured by Rigaku Corporation X-ray tube bulb: Cu
Tube voltage: 50 KV
Tube current: 300 mA
Scanning method: 2θ/θ scan
Scanning rate: 4.0°/min
Sampling interval: 0.02°
Start angle (2θ): 5.0°
Stop angle (2θ): 40.0°
Attachment: standard sample holder
Filter: not used
Incident monochrome: used
Counter monochromator: not used
Divergence slit: open
Divergence longitudinal restriction slit: 10.00 mm
Scattering slit: open
Light-receiving slit: open
Flat monochromator: used
Counter: scintillation counter Next, the following materials were prepared.

6 parts of charge transporting substance (hole transporting substance) represented by the following Formula (C-1)

3 parts of charge transporting substance (hole transporting substance) represented by the following Formula (C-2)

1 part of charge transporting substance (hole transporting substance) represented by the following Formula (C-3)

10 parts of polycarbonate (trade name: Iupilon Z400, manufactured by Mitsubishi Engineering-Plastics Corporation)

0.02 parts of polycarbonate resin having copolymerization unit of the following Formulas (C-4) and (C-5) (x/y=0.95/0.05: viscosity average molecular weight=20,000)

These materials were dissolved in a solvent in which 25 parts of o-xylene, 25 parts of methyl benzoate, and 25 parts of dimethoxymethane were mixed with each other, thereby preparing a coating liquid for a charge transport layer. The coating liquid for a charge transport layer was applied onto the charge generation layer by dip coating to form a coating film, and the coating film was dried at 120° C. for 30 minutes, thereby forming a charge transport layer having a thickness of 12 μm.

(C-1)

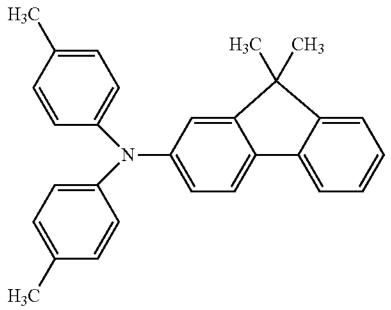

(C-2)

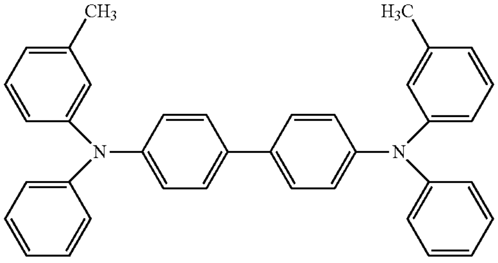

(C-3)

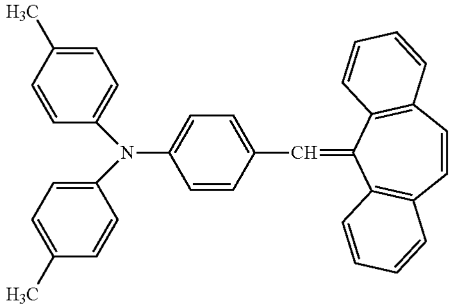

(C-4)

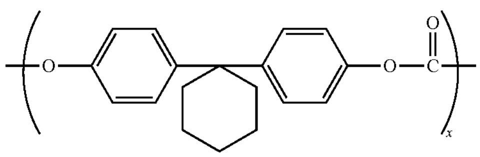

-continued (C-5)

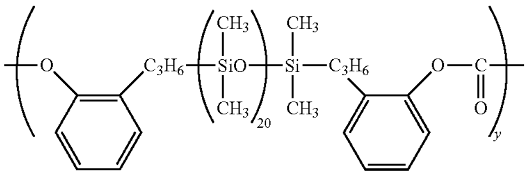

Next, the following materials were prepared.

100 parts of niobium-containing titanium oxide particles (T1-1, specific gravity: 4 g/cm$^3$)

3 parts of compound represented by the following Formula (S-1) (trade name: KBM-3033, manufactured by Shin-Etsu Chemical Co., Ltd.) as silane coupling agent (S-1)

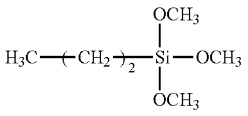

These materials were mixed with 200 parts of toluene, the mixture was stirred with a stirrer for 4 hours, and the stirred mixture was filtered, washed, and then heat-treated at 130° C. for 3 hours. As described above, the surface treatment was performed.

Next, the following materials were prepared.

1 part of compound represented by the following Structural Formula (0-1) as binder resin 4 parts of surface-treated niobium-containing titanium oxide particles as electroconductive particles These materials were mixed with a solvent in which 5 parts of 1-propanol and 5 parts of cyclohexane were mixed with each other, and the mixture was stirred with a stirrer for 6 hours. As described above, the coating liquid for a protection layer was prepared.

The coating liquid for a protection layer was applied onto the charge transport layer by dip coating to form a coating film, and the obtained coating film was dried at 50° C. for 6 minutes. Thereafter, the coating film was irradiated with electron beams for 1.6 seconds in a nitrogen atmosphere while rotating a support (an object to be irradiated) at a speed of 300 rpm under conditions of an acceleration voltage of 70 kV and a beam current of 5.0 mA. A dose at a position of the protection layer was 15 kGy.

Thereafter, the temperature of the coating film was increased to 117° C. under a nitrogen atmosphere. An oxygen concentration from electron beam irradiation to a subsequent heat treatment was 10 ppm.

Next, the coating film was naturally cooled in the atmospheric air until the temperature of the coating film was 25° C., and then the coating film was subjected to a heat treatment under a condition in which the temperature of the coating film was 120° C. for 1 hour, thereby forming a protection layer having a thickness of 2 μm. As described above, the electrophotographic photosensitive member according to Example 1 was produced.

(O-1)

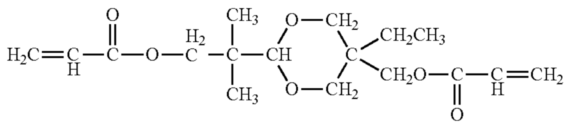

Examples 2 to 23

Each of electrophotographic photosensitive members according to Examples 2 to 23 was produced in the same manner as that of Example 1, except that the type of the niobium-containing titanium oxide particle and the content (vol %) of the protection layer were changed as shown in Table 2.

Example 24

The type and amount of the silane coupling agent used in the surface treatment of the niobium-containing titanium oxide particle were changed to 4 parts of a compound represented by the following Formula (S-2) (trade name: KBM-3103C, manufactured by Shin-Etsu Chemical Co., Ltd.). An electrophotographic photosensitive member according to Example 24 was produced in the same manner as that of Example 1 except for this.

(S-2)

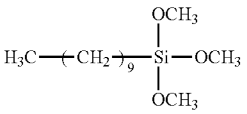

Example 25

The following materials were prepared.

100 parts of tin oxide particles (trade name: S-2000, manufactured by Mitsubishi Materials Corporation)

20 parts of compound represented by Formula (S-2)

These materials were mixed with 200 parts of toluene, the mixture was stirred with a stirrer for 4 hours, and the stirred mixture was filtered, washed, and then heat-treated at 130° C. for 3 hours. As described above, the surface treatment of the tin oxide particle was performed.

An electrophotographic photosensitive member according to Example 25 was produced in the same manner as that of Example 1, except that the type and amount of the electroconductive particle used in formation of the protection layer were changed to 7 parts of the surface-treated tin oxide particles in Example 1.

Example 26

In Example 25, the type and amount of the silane coupling agent used in the surface treatment of the tin oxide particle were changed to a compound represented by the following Formula (S-3) (trade name: KBM-3066, manufactured by Shin-Etsu Chemical Co., Ltd.). An electrophotographic photosensitive member according to Example 26 was produced in the same manner as that of Example 25 except for this.

(S-3)

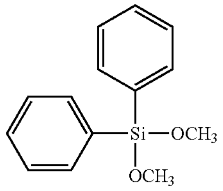

Example 27

In Example 1, the type of the binder resin used in formation of the protection layer was changed to a compound represented by the following Structural Formula (O-2). An electrophotographic photosensitive member according to Example 27 was produced in the same manner as that of Example 1 except for this.

(O-2)

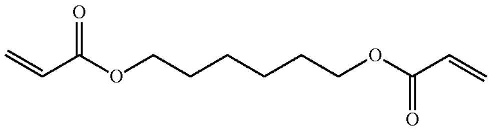

Example 28

In Example 1, the type and amount of the binder resin used in formation of the protection layer were changed to 1.7 parts of the phenol resin (monomer/oligomer of phenol resin) (trade name: Plyophen J-325, resin solid content: 60% by mass, manufactured by Dainippon Ink And Chemicals, Inc.). In addition, the types and amounts of the materials for the mixed solvent used in formation of the protection layer were changed to 5 parts of 1-methoxy-2-propanol and 4 parts of methanol to prepare a coating liquid for a protection layer, and the coating liquid for a protection layer was applied onto the charge transport layer by dip coating, thereby forming a coating film. Thereafter, the coating film was dried at 160° C. for 30 minutes, thereby forming a protection layer having a thickness of 2 μm. An electrophotographic photosensitive member according to Example 28 was produced in the same manner as that of Example 1 except for this.

Example 29

The following materials were prepared.

1 part of blocked isocyanate (trade name: Duranate SBN-70D, manufactured by Asahi Kasei Corporation)

1 part of polyvinyl acetal resin (trade name: KS-5Z, manufactured by SEKISUI CHEMICAL CO., LTD.)

In Example 1, the type and amount of the binder resin used in formation of the protection layer were changed to the above materials. In addition, the types and amounts of the materials for the mixed solvent used in formation of the protection layer were changed to 9 parts of 1-butanol and 6 parts of acetone to prepare a coating liquid for a protection layer, and the coating liquid for a protection layer was applied onto the charge transport layer by dip coating, thereby forming a coating film. Thereafter, the coating film was dried at 170° C. for 30 minutes, thereby forming a protection layer having a thickness of 2 μm. An electrophotographic photosensitive member according to Example 29 was produced in the same manner as that of Example 1 except for this.

Example 30

In Example 1, the type and amount of the binder resin used in formation of the protection layer were changed to 1 part of a polyester resin having a ratio of a structural unit of the following Formula (O-3) to a structural unit of the following (O-4) was 5/5, and having a weight average molecular weight (Mw) of 100,000. In addition, the types and amounts of the materials for the mixed solvent used in formation of the protection layer were changed to 12 parts of chlorobenzene and 8 parts of dimethoxymethane to prepare a coating liquid for a protection layer, and the coating liquid for a protection layer was applied onto the charge transport layer by dip coating, thereby forming a coating film. Thereafter, the coating film was dried at 120° C. for 30 minutes, thereby forming a protection layer having a thickness of 2 μm. An electrophotographic photosensitive member according to Example 30 was produced in the same manner as that of Example 1 except for this.

(O-3)

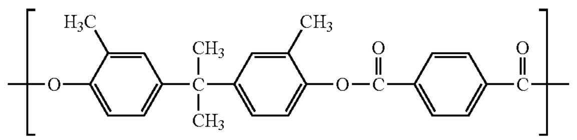

(O-4)

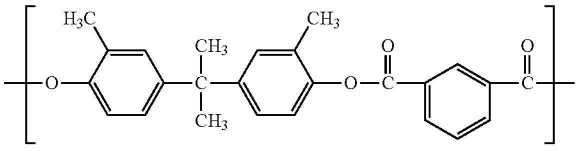

Comparative Examples 1 to 4

In Example 1, the type of the niobium-containing titanium oxide particle used in formation of the protection layer and the content (vol %) of the protection layer were changed as shown in Table 3. Each of electrophotographic photosensitive members according to Comparative Examples 1 to 4 was produced in the same manner as that of Example 1 except for this.

Comparative Example 5

A coating liquid for a protection layer was prepared as follows.

First, the following materials were prepared.

- 10 parts of radically polymerizable monomer (trade name: TMPTA, manufactured by Tokyo Chemical Industry Co., Ltd.)
- 5 parts of compound represented by the following Formula (H-1)
- 0.15 parts of compound represented by the following Formula (H-2)
- 0.15 parts of compound represented by the following Formula (H-3)
- 1.5 parts of fluorine resin particles (trade name: MPE-056, manufactured by Chemours-Mitsui Fluoroproducts Co., Ltd.)
- 0.75 parts of photopolymerization initiator (trade name: Irgacure 184, manufactured by BASF Japan Ltd.)

(H-1)

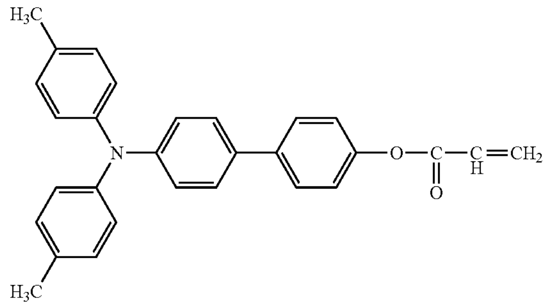

(H-2)

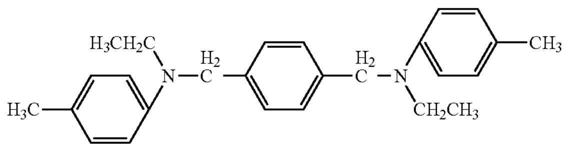

(H-3)

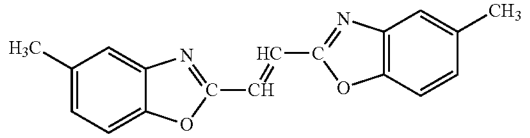

These materials were mixed with 100 parts of tetrahydrofuran, and the mixture was stirred with a stirrer for 6 hours, thereby preparing a coating liquid for a protection layer.

The coating liquid for a protection layer was applied onto the charge transport layer in a nitrogen stream by a spray coating method to form a coating film, and the coating film was left in the nitrogen stream for 10 minutes and then touch-dried. Thereafter, ultraviolet irradiation was performed under the following conditions in an ultraviolet ray irradiation booth in which the inside of the booth was replaced with nitrogen gas so that an oxygen concentration was 2% or less.

Metal halide lamp: 160 W/cm

Irradiation distance: 120 mm

Irradiation intensity: 700 mW/$cm^2$

Irradiation time: 60 seconds

Further, the coating film was dried at 130° C. for 20 minutes, thereby forming a protection layer having a thickness of 5 μm. An electrophotographic photosensitive member according to Comparative Example 5 was produced in the same manner as that of Example 1 except for this.

Comparative Example 6

The following materials were prepared.

- 97 parts of compound represented by the following Formula (H-4)
- 3 parts of compound represented by the following Formula (H-5)

These materials were dissolved in 100 parts of n-propanol, and 100 parts of 1,1,2,2,3,3,4-heptafluorocyclopentane (trade name: ZEORORA H, manufactured by Zeon Corporation) was further added, thereby preparing a coating liquid for a protection layer.

An electrophotographic photosensitive member according to Comparative Example 6 was produced in the same manner as that of Example 1, except that the coating layer for a protection layer was used.

(H-4)

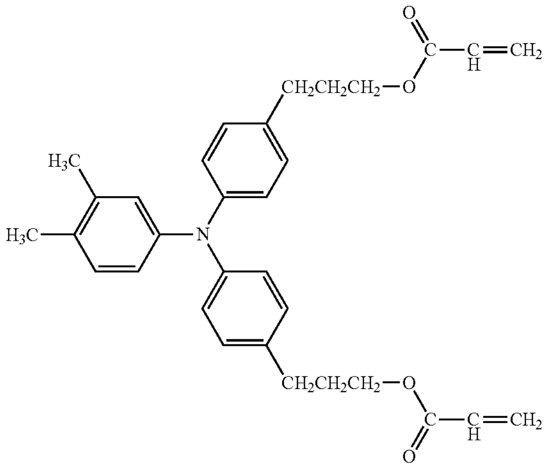

(H-5)

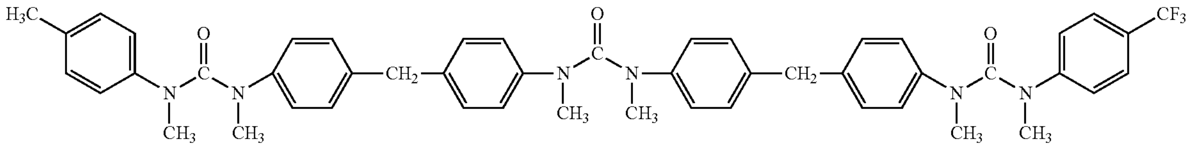

Comparative Example 7

The following materials were prepared.

100 parts by mass of antimony-doped tin oxide particles (trade name: T-1, manufactured by Mitsubishi Materials Corporation)

3 parts of compound represented by the following Formula (H-6)

10 parts by mass of fluorine atom-containing compound (trade name: LS-1090, manufactured by Shin-Etsu Silicone Co., Ltd.)

These materials were mixed with 250 parts of ethanol, the mixture was stirred with a stirrer for 48 hours, and the stirred mixture was filtered, washed with water, and then heat-treated at 150° C. for 3 hours. As described above, the surface treatment of the antimony-doped tin oxide particle was performed.

The following materials were further prepared.

18 parts of compound represented by Formula (O-1)

6.8 parts of 2-methylthioxanthone as photopolymerization initiator 45 parts of the surface-treated tin oxide particles 14 parts of ethylene tetrafluoroethylene resin particles (average particle size: 0.18 μm)

These materials were mixed with 150 parts of ethanol and the mixture was dispersed with a sand mill for 90 hours. As described above, the coating liquid for a protection layer was prepared.

The coating liquid for a protection layer was applied onto the charge transport layer prepared in the same manner as that of Example 1 by dip coating to form a coating film, and the obtained coating film was dried at 50° C. for 6 minutes. In addition, curing of the coating film with ultraviolet rays was performed in the same manner as that of Comparative Example 5. An electrophotographic photosensitive member according to Comparative Example 7 was produced in the same manner as that of Example 1 except for this.

(H-6)

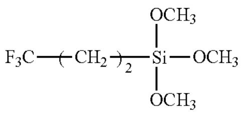

Comparative Example 8

The following materials were prepared.

10 parts of niobium-containing titanium oxide particles (volume average particle size of 6 nm, a content of niobium of 0.5% by mass)

10 parts of compound represented by the following Formula (H-7)

1 part of polymerization initiator (1-hydroxycyclohexyl (phenyl)methanone) These materials were mixed with 40 parts of n-propyl alcohol, and the mixture was dispersed with a sand mill for 2 hours, thereby preparing a coating liquid for a protection layer.

An electrophotographic photosensitive member according to Comparative Example 8 was produced in the same manner as that of Comparative Example 7, except that the coating layer for a protection layer was used in Comparative Example 7.

(H-7)

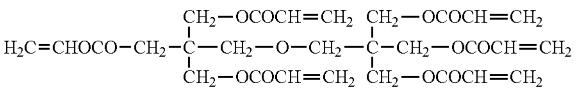

<Evaluation of Injectability>

A modified electrophotographic apparatus (laser beam printer) (trade name: HP LaserJet Enterprise Color M553dn, manufactured by Hewlett-Packard Company) was used for evaluation of an injectability. The electrophotographic apparatus used for the evaluation was modified so that an image exposure amount, the amount of current flowing from a charging roller to a support of an electrophotographic photosensitive member (hereinafter, referred to as a "total current"), and a voltage applied to the charging roller were adjusted and measured.

In addition, a process cartridge for a cyan color of the electrophotographic apparatus was modified, and a potential probe (model 6000B-8, manufactured by Trek Japan) was mounted at a developing position. Next, a surface potential was measured at the central portion of the electrophotographic photosensitive member using a surface potentiometer (model 344, manufactured by Trek Japan).

The electrophotographic photosensitive member according to each of Examples and Comparative Examples was mounted, 1,000 V was applied to a charging roller with a direct current, and the electrophotographic photosensitive member was charged while the electrophotographic photosensitive member was rotated at 60 rpm, under an environment of a temperature of 23° C. and a humidity of 50% RH. An injectability of A/1,000 was determined by measuring a potential A on the surface of the electrophotographic photosensitive member at this time.

The results are shown in Tables 2 and 3.

<Charge Retainability Evaluation>

A photosensitive member testing apparatus (trade name: CYNTHIA59, manufactured by GEN-TECH, Inc.) was used for measuring a charge retainability. The electrophotographic photosensitive member according to each of Examples and Comparative Examples was installed in the photosensitive member testing apparatus under an environment of temperature of 23° C./humidity of 50% RH. In addition, a charger was set so that a rectangular wave voltage having a frequency of 1 Hz, a Voffset of −450 V, and a Vpp of 500 V was applied to the surface of the electrophotographic photosensitive member using an electroconductive rubber roller having a diameter of 8 mm as a charging member.

In the measurement of the potential, a surface potential probe (model 6000B-8, manufactured by Trek Japan) was installed at a position away from the electrophotographic photosensitive member by 1 mm, and a surface potentiometer (model 344, manufactured by Trek Japan) was used.

The charge retainability was determined according to the following procedures 1 to 4 under the following conditions.

When the electrophotographic photosensitive member prepared as follows was measured as an index when the charge retainability was high, the charge retainability was 11.2.

A polycarbonate (trade name: Iupilon Z400, manufactured by Mitsubishi Engineering-Plastics Corporation) layer having a thickness of 20 μm was formed on an aluminum cylinder (JIS-A3003, aluminum alloy) having a diameter of 24 mm and a length of 257.5 mm. The obtained electrophotographic photosensitive member obtained as described above was used as an index when the charge retainability was high.

The results are shown in Tables 2 and 3.

<Image Smearing Evaluation>

As an electrophotographic apparatus, a modified laser beam printer (trade name: HP LaserJet Enterprise Color M553dn, manufactured by Hewlett-Packard Company) was used. The electrophotographic apparatus used for the evaluation was modified so that an image exposure amount, the amount of current flowing from a charging roller to a support of an electrophotographic photosensitive member (hereinafter, referred to as a "total current"), and a voltage applied to the charging roller were adjusted and measured.

First, the electrophotographic apparatus and the electrophotographic photosensitive member according to each of Examples and Comparative Examples were left under an environment of temperature of 30° C./humidity of 80% RH for 24 hours or longer, and then the electrophotographic photosensitive member was mounted in the cartridge for the cyan color of the electrophotographic apparatus.

Next, an applied voltage was applied while gradually being increased from −400 V to −2,000 V at an interval of 100 V, and a total current at each applied voltage was measured. Then, a graph in which the applied voltage and the total current were used for a horizontal axis and a vertical axis, respectively, was created, and an applied voltage was set by determining an applied voltage at which a current value deviated from a first-order approximation curve at the applied voltage of −400 V to −800 V was 100 μA.

Next, a solid image output was performed with a cyan color alone on an A4 size plain paper, and an image exposure amount was set so that a density on the paper was 1.45 using a spectro-densitometer (trade name: X-Rite504, manufactured by X-Rite Incorporated).

Next, an A4 size square grid image having a line width of 0.1 mm and a line interval of 10 mm was continuously output on 10,000 sheets with a cyan color alone. After the image output, a main power supply of the electrophotographic apparatus was turned off, and the electrophotographic apparatus was left under an environment of temperature of 30° C./humidity of 80% RH for three days. After leaving the electrophotographic apparatus, the main power supply of the electrophotographic apparatus was turned on, one sheet of the square grid image was similarly output, and image smearing on the output image was visually observed to evaluate the image smearing based on the following criteria. Further, the same evaluation was performed by setting the number of output sheets to 20,000.

Evaluation ranks were as follows.

Rank 5: No abnormality was observed on the grid image.

Rank 4: The horizontal line on the grid image was broken, but no abnormality was observed on the vertical line.

Rank 3: The horizontal line on the grid image disappeared, but no abnormality was observed on the vertical line.

Rank 2: The horizontal line on the grid image disappeared, and the vertical line was broken.

Rank 1: The horizontal line on the grid image disappeared, and the vertical line also disappeared.

In this case, the horizontal line on the grid image refers to a line parallel to a cylindrical axis direction of the electrophotographic photosensitive member, and the vertical line refers to a line perpendicular to the cylindrical axis direction of the electrophotographic photosensitive member.

The results are shown in Tables 2 and 3.

TABLE 2

| | Electroconductive particle | | | Protection layer Volume | | | Image smearing evaluation | | |
|---|---|---|---|---|---|---|---|---|---|
| Example | Type | Content (vol %) | Protection layer Resin binder | resistivity (Ω · cm) | Charge retainability | Injectability | Initial state | After outputting 10,000 sheets | After outputting 20,000 sheets |
| 1 | T1-1 | 50 | O-1 | $2.2 \times 10^{12}$ | 10.3 | 0.76 | 5 | 5 | 5 |
| 2 | T1-2 | 60 | O-1 | $5.3 \times 10^{11}$ | 9.5 | 0.87 | 5 | 5 | 4 |
| 3 | T1-5 | 50 | O-1 | $4.3 \times 10^{12}$ | 10 | 0.80 | 5 | 5 | 5 |
| 4 | T1-6 | 50 | O-1 | $3.7 \times 10^{12}$ | 9.8 | 0.72 | 5 | 5 | 4 |
| 5 | T1-1 | 40 | O-1 | $8.1 \times 10^{12}$ | 9.9 | 0.71 | 5 | 5 | 4 |
| 6 | T1-1 | 45 | O-1 | $7.0 \times 10^{12}$ | 10.4 | 0.75 | 5 | 5 | 5 |
| 7 | T1-1 | 65 | O-1 | $4.8 \times 10^{11}$ | 10.8 | 0.83 | 5 | 5 | 5 |
| 8 | T1-1 | 70 | O-1 | $5.2 \times 10^{10}$ | 10.1 | 0.86 | 5 | 5 | 4 |
| 9 | T1-1 | 42 | O-1 | $3.9 \times 10^{13}$ | 9.7 | 0.72 | 5 | 5 | 4 |
| 10 | T1-2 | 50 | O-1 | $4.7 \times 10^{11}$ | 10.5 | 0.79 | 5 | 5 | 5 |
| 11 | T1-1 | 67 | O-1 | $7.7 \times 10^{11}$ | 9.8 | 0.82 | 5 | 5 | 4 |
| 12 | T1-2 | 70 | O-1 | $1.0 \times 10^{9}$ | 9.6 | 0.87 | 5 | 5 | 4 |
| 13 | T1-2 | 60 | O-1 | $1.0 \times 10^{10}$ | 10.1 | 0.83 | 5 | 5 | 5 |
| 14 | T1-4 | 45 | O-1 | $1.0 \times 10^{13}$ | 10.6 | 0.79 | 5 | 5 | 5 |
| 15 | T1-4 | 40 | O-1 | $1.0 \times 10^{14}$ | 11.3 | 0.72 | 5 | 5 | 4 |
| 16 | T1-1 | 55 | O-1 | $6.3 \times 10^{9}$ | 9.8 | 0.85 | 5 | 5 | 4 |
| 17 | T1-5 | 50 | O-1 | $3.5 \times 10^{11}$ | 10.4 | 0.82 | 5 | 5 | 5 |
| 18 | T1-10 | 43 | O-1 | $4.2 \times 10^{13}$ | 10.9 | 0.71 | 5 | 5 | 4 |
| 19 | T1-8 | 50 | O-1 | $7.7 \times 10^{12}$ | 10.8 | 0.71 | 5 | 5 | 4 |
| 20 | T1-4 | 50 | O-1 | $7.0 \times 10^{11}$ | 10.3 | 0.83 | 5 | 5 | 4 |
| 21 | T1-3 | 50 | O-1 | $5.3 \times 10^{13}$ | 10.5 | 0.70 | 5 | 5 | 5 |
| 22 | T1-6 | 50 | O-1 | $3.1 \times 10^{11}$ | 10.6 | 0.78 | 5 | 5 | 5 |
| 23 | T2-1 | 50 | O-1 | $4.3 \times 10^{12}$ | 10.7 | 0.80 | 5 | 5 | 4 |
| 24 | T1-1 | 50 | O-1 | $2.1 \times 10^{13}$ | 11.2 | 0.70 | 5 | 5 | 4 |
| 25 | Tin oxide particle | 40 | O-1 | $3.7 \times 10^{9}$ | 9.6 | 0.91 | 5 | 4 | 4 |
| 26 | Tin oxide particle | 40 | O-1 | $8.1 \times 10^{9}$ | 9.5 | 0.93 | 5 | 4 | 4 |
| 27 | T1-1 | 50 | O-2 | $7.0 \times 10^{12}$ | 10.6 | 0.83 | 5 | 5 | 5 |
| 28 | T1-1 | 50 | Urethane resin | $4.8 \times 10^{11}$ | 9.8 | 0.83 | 5 | 5 | 4 |
| 29 | T1-1 | 50 | Phenol resin | $3.4 \times 10^{12}$ | 9.9 | 0.81 | 5 | 5 | 4 |
| 30 | T1-1 | 50 | Polyester resin | $1.3 \times 10^{11}$ | 10.2 | 0.83 | 5 | 5 | 5 |

TABLE 3

| | Electroconductive particle | | Protection layer | Protection layer Volume | | | Image smearing evaluation | | |
|---|---|---|---|---|---|---|---|---|---|
| Comparative Example | Type | Content (vol %) | Resin binder | resistivity (Ω · cm) | Charge retainability | Injectability | Initial state | After outputting 10,000 sheets | After outputting 20,000 sheets |
| 1 | T1-1 | 39 | O-1 | $8.9 \times 10^{12}$ | 10.7 | 0.53 | 5 | 3 | 2 |
| 2 | T1-1 | 71 | O-1 | $1.1 \times 10^{11}$ | 9.8 | 0.81 | 5 | 4 | 2 |
| 3 | T1-7 | 45 | O-1 | $2.0 \times 10^{14}$ | 10.8 | 0.50 | 5 | 2 | 2 |
| 4 | T1-9 | 75 | O-1 | $5.0 \times 10^{8}$ | 9.4 | 0.96 | 4 | 1 | 1 |
| 5 | — | — | H-1 | $6.4 \times 10^{14}$ | 11.3 | 0.51 | 5 | 3 | 3 |
| 6 | — | — | H-4 | $5.5 \times 10^{14}$ | 11.6 | 0.49 | 5 | 4 | 3 |
| 7 | Tin oxide particle | 17 | O-1 | $3.3 \times 10^{10}$ | 10.3 | 0.62 | 5 | 3 | 1 |
| 8 | Titanium oxide particle | 19 | H-9 | $4.6 \times 10^{13}$ | 10.5 | 0.47 | 5 | 3 | 1 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An electrophotographic photosensitive member, comprising:

an electroconductive support;

a photosensitive layer; and a protection layer, the protection layer comprising niobium-containing titanium oxide electroconductive particles, wherein a content of the electroconductive particles in the protection layer is 40 to 70 vol %, and a volume resistivity of the protection layer is $1.0 \times 10^9$ to $1.0 \times 10^{14}$ Ω·cm.

2. The electrophotographic photosensitive member according to claim 1, which has a charge retainability is 9.5 or more, wherein charge retainability is determined by procedures 1 to 4:

procedure 1 applies a voltage to a surface of the electrophotographic photosensitive member from one direction while rotating the electrophotographic photosensitive member at a rotational speed of 30 rpm under an environment of a temperature of 23° C. and a humidity of 50% RH, the voltage being a rectangular wave voltage having a frequency of 1 Hz, a Voffset of −450 V, and a Vpp of 500 V, procedure 2 measures a potential on the surface of the electrophotographic photosensitive member at a position at which a portion to which the voltage is applied to the surface of the electrophotographic photosensitive member is rotated for 0.30 seconds at a measurement interval of 100 μs for a predetermined time within the range from 10 to 20 seconds, procedure 3 plots the values obtained by the measurement using μs as a unit of a horizontal axis and V as a unit of a vertical axis, and a slope of each of a regression line derived from previous 25 measurement points and a regression line derived from latter 25 measurement points is determined at each measurement point, and procedure 4 calculates charge retainability by averaging absolute values of a maximum value and a minimum value of the obtained slopes.

3. The electrophotographic photosensitive member according to claim 1, wherein the electroconductive particle is a particle containing anatase-type titanium oxide as a core material, and titanium oxide containing niobium coating a surface of the core material.

4. The electrophotographic photosensitive member according to claim 1, wherein a content of niobium in the electroconductive particles is 2.6 to 10.0% by mass.

5. The electrophotographic photosensitive member according to claim 1, wherein the protection layer contains a polymerized product of a composition containing a radically polymerizable monomer.

6. A process cartridge integrally supporting an electrophotographic photosensitive member and at least one unit selected from the group consisting of a charging unit, a developing unit and a cleaning unit, and being detachably attachable to a main body of an electrophotographic apparatus, the electrophotographic photosensitive member comprising:

an electroconductive support;

a photosensitive layer; and a protection layer, the protection layer comprising niobium-containing titanium oxide electroconductive particles, wherein a content of the electroconductive particles in the protection layer is 40 to 70 vol %, and a volume resistivity of the protection layer is $1.0\times10^9$ to $1.0\times10^{14}$ Ω·cm.

7. An electrophotographic apparatus, comprising:

an electrophotographic photosensitive member comprising an electroconductive support, a photosensitive layer, and a protection layer comprising niobium-containing titanium oxide electroconductive particles, a charging unit;

an exposing unit;

a developing unit; and a transfer unit, wherein a content of the electroconductive particles in the protection layer is 40 to 70 vol %, and a volume resistivity of the protection layer is $1.0\times10^9$ to $1.0\times10^{14}$ Ω·cm.

* * * * *